United States Patent
Kalgaonkar et al.

(10) Patent No.: US 11,959,017 B1
(45) Date of Patent: Apr. 16, 2024

(54) METHODS AND MATERIALS FOR WELLBORE FLUID DIVERSION USING VISCO-ELASTIC SURFACTANTS

(71) Applicants: SAUDI ARABIAN OIL COMPANY, Dhahran (SA); KING FAHD UNIVERSITY OF PETROLEUM & MINERALS, Dhahran (SA)

(72) Inventors: Rajendra Arunkumar Kalgaonkar, Dhahran (SA); Mohammed Abudullah Bataweel, Dhahran (SA); Nour Othman Baqader, Khobar (SA); Nisar Ullah, Dhahran (SA); Muhammad Mansha, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 17/938,798

(22) Filed: Oct. 7, 2022

(51) Int. Cl.
*E21B 43/14* (2006.01)
*C09K 8/584* (2006.01)

(52) U.S. Cl.
CPC ................. *C09K 8/584* (2013.01)

(58) Field of Classification Search
CPC ............... C09K 8/584; E21B 43/14
USPC ....................................... 166/305.1
See application file for complete search history.

(56) References Cited

U.S. PATENT DOCUMENTS

| | | | |
|---|---|---|---|
| 3,939,911 A | 2/1976 | Maddox, Jr. et al. | |
| 5,250,642 A | 10/1993 | Ahmed et al. | |
| 7,237,608 B2 | 7/2007 | Fu et al. | |
| 7,373,977 B1 | 5/2008 | Berger et al. | |
| 7,621,334 B2 | 11/2009 | Welton et al. | |
| 8,637,622 B2 | 1/2014 | Monin et al. | |
| 8,714,283 B2 | 5/2014 | Gatlin et al. | |
| 9,023,966 B2 | 5/2015 | Zhang et al. | |
| 9,080,095 B2 | 7/2015 | Morvan et al. | |
| 10,047,279 B2 * | 8/2018 | Li | C09K 8/68 |
| 10,479,762 B1 * | 11/2019 | Hussain | C07C 309/14 |
| 2008/0045420 A1 | 2/2008 | Karagianni et al. | |
| 2010/0197530 A1 | 8/2010 | Gupta et al. | |
| 2011/0071056 A1 | 3/2011 | Saini et al. | |
| 2011/0071100 A1 | 3/2011 | Ben-Sasson et al. | |
| 2012/0085534 A1 | 4/2012 | Morvan et al. | |
| 2013/0327523 A1 | 12/2013 | Santa et al. | |

(Continued)

FOREIGN PATENT DOCUMENTS

| CA | 3093615 A1 | 11/2019 |
|---|---|---|
| CN | 101690876 A | 4/2010 |

(Continued)

OTHER PUBLICATIONS

Chu et al., "A Facile Route towards the Preparation of Ultra-Long-Chain Amidosulfobetaine Surfactants," Synlett 2009, 2655-2658, 4 pages.

(Continued)

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

A diverter agent includes a morpholinium based zwitterionic surfactant having a sulfonate terminal moiety; and an ammonium based zwitterionic surfactant.

10 Claims, 2 Drawing Sheets

(56) References Cited

U.S. PATENT DOCUMENTS

| | | |
|---|---|---|
| 2014/0262529 A1 | 9/2014 | Quintero et al. |
| 2015/0247393 A1 | 9/2015 | Portwood |
| 2015/0291874 A1* | 10/2015 | Gatlin .............. C09K 8/703 |
| | | 166/309 |
| 2018/0037792 A1 | 2/2018 | Champagne et al. |
| 2018/0112119 A1 | 4/2018 | Wu et al. |
| 2018/0282616 A1 | 10/2018 | Debord et al. |
| 2019/0144737 A1 | 5/2019 | Morales et al. |
| 2019/0256458 A1 | 8/2019 | Hussain et al. |
| 2019/0367800 A1 | 12/2019 | Oliveira et al. |
| 2020/0299561 A1* | 9/2020 | Sudur Zalluhoglu .. C09K 8/035 |
| 2020/0339868 A1 | 10/2020 | Kakadjian et al. |
| 2021/0253942 A1 | 8/2021 | Russum et al. |

FOREIGN PATENT DOCUMENTS

| | | |
|---|---|---|
| CN | 101775276 A | 7/2010 |
| CN | 103275693 A | 9/2013 |
| CN | 103936634 A | 7/2014 |
| CN | 104087280 A | 10/2014 |
| CN | 104109518 A | 10/2014 |
| CN | 104140802 A | 11/2014 |
| CN | 104531121 A | 4/2015 |
| CN | 106268496 A | 1/2017 |
| CN | 108191694 A | 6/2018 |
| CN | 109111908 A | 1/2019 |
| CN | 109233779 A | 1/2019 |
| CN | 110483340 A | 11/2019 |
| CN | 109486476 B | 1/2020 |
| RU | 2690173 C2 | 5/2019 |
| WO | 2001018147 A1 | 3/2001 |
| WO | 2004096942 A1 | 11/2004 |
| WO | 2007056284 A2 | 5/2007 |
| WO | 2015126418 A1 | 8/2015 |
| WO | 2018/213627 A1 | 11/2018 |
| WO | 2019120697 A1 | 6/2019 |

OTHER PUBLICATIONS

Shakil Hussain S M et al.; "Synthesis, Characterization and Surface Properties of Amidosulfobetaine Surfactants Bearing Odd-Number Hydrophobic Tail"; Journal of Surfactants and Detergents; Springer; vol. 19; No. 2; Feb. 1, 2016; pp. 413-420 (8 pages).

Hussain, S.M.S. et al.; "Synthesis of Novel Ethoxylated Quaternary Ammonium Gemini Surfactants for Enhanced Oil Recovery Application"; Energies, vol. 12, No. 9, 1731, May 8, 2019 (16 pages).

International Search Report and Written Opinion issued in Application No. PCT/US2020/040631, dated Mar. 4, 2021 (13 pages).

International Search Report and Written Opinion issued in Application No. PCT/US2020/040635, dated Mar. 5, 2021 (13 pages).

International Search Report and Written Opinion issued in Application No. PCT/US2020/040636, dated Mar. 9, 2021 (30 pages).

Kamal Muhammad Shahzad, "A Review of Gemini Surfactants: Potential Application in Enhanced Oil Recovery", Journal of Surfactants and Detergents; Springer, Berlin, DE, vol. 19, No. 2; Dec. 26, 2015; pp. 223-236 (14 pages).

Kamal et al.; "A Zwitterionic Surfactant Bearing Unsaturated Tail for Enhanced Oil Recovery in High-Temperature High-Salinity Reservoirs"; Journal of Surfactants and Detergents, vol. 21, No. 1, Jan. 2018, pp. 165-174 (10 pages).

Yu, Qun et al., "Study of Interfacial Tension Between Oil and Surfactant Polymer Floording", Petroleum Science and Technology, Taylor & Francis Group, vol. 28, Oct. 15, 2010, pp. 1846-1854 (9 pages).

Office Action Issued in Related U.S. Appl. No. 16/895,779, dated May 12, 2023, 23 pages.

Office Action Issued in Related U.S. Appl. No. 17/938,809, dated Nov. 9, 2023 (9 pages).

* cited by examiner

METHODS AND MATERIALS FOR WELLBORE FLUID DIVERSION USING VISCO-ELASTIC SURFACTANTS

BACKGROUND

In matrix stimulation or matrix acidizing treatment, a treatment fluid is used to stimulate a reservoir by pumping the fluid below the fracturing pressure. The reservoir may be a carbonate reservoir. The treatment fluid may be called a stimulation fluid. When the stimulation fluid includes an acid, it may be called an acid stimulation fluid. The stimulation fluid can react with the reservoir rock. Upon reaction with the rock, the rock may dissolve and create a pathway for hydrocarbon production through the reservoir. However, when the stimulation fluid has a low viscosity it may react at the face of the rock instead of first traveling through the porous rock to react. In this way, penetration of the stimulation fluid may be limited to a few centimeters beyond the face of the rock at an introduction site downhole. As a result, matrix stimulation may not be an effective method for stimulating a reservoir because a conductive pathway for hydrocarbon production may not be created. In addition, carbonate reservoirs may be heterogeneous with respect to permeability. Thus, the low viscosity stimulation fluid may penetrate into high permeable zones in the reservoir while the low permeable zones are not treated. In sum, conventional matrix stimulation may result in non-uniform treatment of the reservoir.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a diverter agent that includes a morpholinium based zwitterionic surfactant having a sulfonate terminal moiety and an ammonium based zwitterionic surfactant.

In another aspect, embodiments disclosed herein relate to a diverter agent, that includes a surfactant composition. The surfactant composition may include a morpholinium based zwitterionic surfactant including a sulfonate terminal moiety having formula (I):

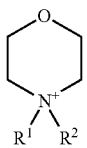

(formula (I)). In formula (I), $R_1$ and $R_2$ are alkyl groups that are the same or different having from 1 to 10 carbons and sulfonate terminal moieties. The surfactant composition may include an ammonium based zwitterionic surfactant having formula (II):

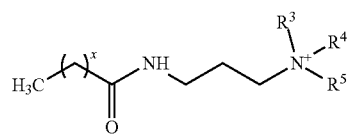

(formula (II)). In formula (II), $R_3$ is an alkyl group having from 1 to 4 carbons (such as a saturated alkyl group or a linear saturated alkyl group) with a sulfonate terminal moiety or a carboxylate terminal moiety, $R_4$ and $R_5$ are alkyl groups that are the same or different having from 1 to 10 carbons, and X is an integer from 15 to 27. The surfactant composition may include an activator selected from the group consisting of calcium chloride, sodium chloride, potassium chloride, magnesium chloride, and combinations thereof.

In yet another aspect, embodiments disclosed herein relate to a diverter fluid that includes a base fluid; an organic solvent; a morpholinium based zwitterionic surfactant including a sulfonate terminal moiety; an ammonium based zwitterionic surfactant; and an activator. The morpholinium based zwitterionic surfactant having a sulfonate terminal moiety and the ammonium based zwitterionic surfactant are thermally stable from about 20° C. to about 350° C.

Other aspects and advantages of the claimed subject matter will be apparent from the following description and the appended claims.

DETAILED DESCRIPTION

Figure 1:
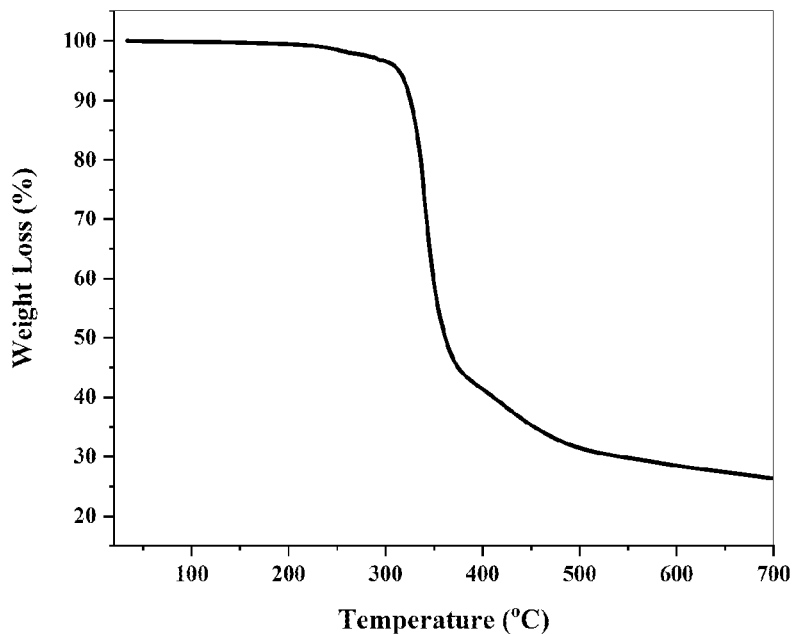
FIG. 1 shows a thermogravimetric analysis chart (Weight Loss (%) vs. Temperature (° C.)) of N,N-bis-(4-sulfonatobutyl)-morpholinium ("Mor-BS"), according to one or more embodiments herein.

One or more embodiments in accordance with the present disclosure relate to diverter agents (also termed diversion agents) for stimulation fluids and methods to use such diverter agents downhole. More specifically, one or more embodiments herein are directed to diverter agent compositions and methods for producing a gel based composition from the diverter agent compositions. One or more embodiments herein are directed toward a diverter agent including a zwitterionic surfactant and producing a gelled diverter agent by contacting the zwitterionic surfactant with an activator. Therefore, the diverter agent and compositions thereof may be viscoelastic.

In one or more embodiments, the diverter agent (composition) includes a morpholinium based surfactant. In one or more embodiments, the morpholinium based surfactant is zwitterionic. In one or more embodiments, the diverter agent composition includes an ammonium based surfactant. In one or more embodiments, the ammonium based surfactant is zwitterionic. In one or more embodiments, the diverter agent composition includes a morpholinium based surfactant and an ammonium based surfactant combination. In one or more embodiments, a salt is an activator that gels the diverter agent composition. The salt may be a calcium salt, a sodium salt, a potassium salt, a magnesium salt, or a combination thereof. The combination of morpholinium and ammonium based surfactants and activator may form a gelled composition based diverter agent. The diverter agent composition may be a liquid that may be converted into gel, called a "gelled diverter agent" composition, and back to a diverter agent composition that is a liquid.

In one or more embodiments, the diverter agent is capable to the divert a stimulation fluid while gelled. The stimulation fluid may be an acidizing fluid. The acidizing fluid may be a matrix acidizing fluid. In one or more embodiments, the gelled diverter agent is capable to be broken to a liquid and flow back while the liquid. The gelled diverter agent may be capable of being broken by an organic solvent, such as hydrocarbons.

In one or more embodiments, a diverter fluid includes the diverter agent and one or more of a solvent and a base fluid. The diverter fluid may be a pill fluid. The diverter fluid may be a self-diverting stimulation fluid.

The formation of a gel in a high permeability zone using the combination of surfactants and activator according to one or more embodiments herein decreases fluid communication in the respective permeability zone.

Permeability in a reservoir may be heterogeneous. The reservoir may include a high permeability zone, a low permeability zone, or a combination thereof. As used throughout, a high permeability zone may refer to an area of the reservoir that is encountered during a drilling operation with a greater permeability than another reservoir zone with a lower permeability, comparatively. High permeable zones may often be separated by layers of fine-grained material, such as clay, shale, or silt, which may serve as confining beds. One of ordinary skill in the art would appreciate the disparity between a high permeability zone and a low permeability zone in a reservoirs. The high permeability zone can be due to any kind of permeability between a wellbore and subterranean formation. High permeability zones that can be addressed by the gelled diverter agent from a diverter agent composition described herein can range from zones with minor seepage to complete loss of a fluid due to permeability. In general, a high permeability zone relates to a zone having a mix of permeabilities ranging from about 0.01 millidarcy (mD) to about 10 mD. A low permeability zone relates to a zone having a mix of permeabilities less than the permeability of the high permeability zone. Thus, the low permeability zone may also be in a range of about 0.01 millidarcy (mD) to about 10 mD or less, so long as the low permeability zone has a permeability that is less than the high permeability zone.

In one or more embodiments, the diverter agent is introduced in a wellbore traversing a reservoir that includes a high permeable zone, such that the diverter agent contacts the high permeability zone. Simultaneously, the activator that may be present in the diverter agent mixes with the surfactants therein, in the high permeability zone.

The diverter agent is heated in the reservoir at downhole conditions. Upon heating, the morpholinium and ammonium based surfactants in combination with the activator may form the gelled diverter agent in the high permeability zone. The permeability of the zone may be reduced to an extent that the high permeability zone becomes a low permeability zone. In one or more embodiments, the diverter agent heats and gels to form a gelled diverter agent in the high permeability zone, subsequently forming a low permeability zone in the reservoir from what was previously the high permeability zone. The heat may be associated with the downhole conditions (temperature and pressure).

In one or more embodiments, the morpholinium based surfactant, the ammonium based surfactant, and the activator are mixed to form a diverter agent and subsequently introduced in the wellbore. The mixture thus introduced traverses the high permeability zone and may form a gel therein, resulting in decreased permeability.

In one or more embodiments, a diverter agent is introduced as a single pill in the wellbore. However, the diverter agent may be introduced in more than one pill. For example, the diverter agent may be introduced with two or more pills of varying concentration.

In one or more embodiments, a surfactant composition, or a mixture of the morpholinium and ammonium based surfactants, is introduced as a single pill in the wellbore. However, the surfactant composition may be introduced in more than one pill. For example, the surfactant composition may be introduced with two or more pills of varying concentration.

In one or more embodiments, an activator is introduced as a single pill in the wellbore. However, the activator may be introduced in more than one pill. For example, the activator may be introduced with two or more pills of varying concentration.

The surfactant composition may be introduced in the wellbore prior to or after the introduction of the activator in the wellbore. In one or more embodiments, the surfactant composition is introduced in a wellbore traversing a reservoir that includes a high permeability zone, such that the surfactant composition contacts the high permeability zone. In one or more embodiments, the activator is introduced in a wellbore traversing a reservoir that includes a high permeability zone, such that the activator contacts the high permeability zone.

The mixture of the surfactant composition may be introduced in the wellbore without premixing. In other words, the surfactant composition may not be premixed. In another example, the morpholinium based surfactant, the ammonium based surfactant and the activator may not be premixed.

The gelling time, or the time for which the diverter agent begins to form a gel, of may be controlled. For example, the gelling time may be affected by the concentration of activator used. The amount of activator used may depend upon the method used for introduction of the diverter agent into the high permeability zone via the wellbore. When a diverter agent (either with or without a base fluid) is premixed, a longer gel time may be desirable. On the other hand, the diverter agent may not be premixed.

In one or more embodiments, the time to form a gel is from about 1 minute to 6 hours. For example, the time to form a gel may be in a range having a lower limit of one of about 1, about 5, about 10, about 15, about 20, about 25, or about 30 minutes and an upper limit of one of about 20 minutes, about 25 minutes, about 30 minutes, about 35 minutes, about 40 minutes, about 45 minutes, about 50 minutes, about 55 minutes, about 1 hour, about 2 hours, about 3 hours, about 4 hours, about 5 hours, or about 6 hours where any lower limit is paired with any mathematically compatible upper limit. The time to form a gel is dependent upon temperature. The time to form a gel may be in a temperature range from about 50° C. to about 100° C., but is not limited thereto. For example, some downhole temperatures are greater than about 100° C., such as up to about 120° C., about 140° C., about 160° C., or about 180° C. The temperature range to form a gel in the prescribed time may be in a range having a lower limit of one of about 50° C., about 55° C., about 60° C., about 65° C., about 70° C., about 75° C., or about 80° C., to an upper limit of one of about 70° C., about 75° C., about 80° C., about 85° C., about 90° C., about 95° C., or about 100° C. where any lower limit is paired with any mathematically compatible upper limit. The lower and upper limit may vary depending on the downhole temperature. Advantageously, diverter agents and methods of use described herein exhibit viscosity increases (to form a gel) at downhole temperatures. In one or more embodiments, a diverter agent is free flowing at room temperature (that is from about 15° C. to about 25° C.).

In one or more embodiments, in the method to produce a gelled diverter agent, when a high permeability zone is encountered a diverter agent is produced by mixing the morpholinium based surfactant, the ammonium based surfactant, and the activator. The diverter agent can be allowed to migrate to the high permeability zone. The volume of the diverter agent can be based on the estimated size of the high permeability zone.

The amount of activator can be based on the desired gel formation time. In one or more embodiments of the method to produce a gel diverter agent, an activator pill is produced by mixing a base fluid and an activator.

In one or more embodiments, the surfactant composition and the activator intimately intermingle downhole to form a diverter agent. In one or more embodiments, the diverter agent is directly introduced downhole. The amount of chemical activator can be based on the desired gel formation time, with an greater concentration of activator resulting in a faster gel time compared to a lower concentration of activator. As the temperature of the diverter agent increases, its viscosity increases to form a gel, or a gelled diverter agent. The gelled diverter agent then forms in the high permeability zone and the gelled diverter agent fills the zone, reducing or eliminating permeability in the zone. Similar considerations and effects may be used in one or more embodiments where the surfactants are introduced to the wellbore in a first pill prior to contact of the surfactants with the activator that is introduced in a second pill, and vice versa. Similar considerations and effects may be used in one or more embodiments where surfactants are introduced to the wellbore in a first pill and a second pill prior to contact of the activator that is introduced in a third pill, and vice versa.

The method may include introducing a stimulation fluid in the wellbore. The stimulation fluid may be introduced either with the diverter agent as a single pill or after the diverter agent as a separate pill. The stimulation fluid may be introduced either with the activator or after the activator as a separate pill. In addition, the diverter agent may be added to a stimulation fluid before introducing the stimulation fluid to in the wellbore, whereby the stimulation fluid is self-diverting.

As the stimulation fluid reaches the zone of the wellbore that includes the diverter agent as previously described, the permeability of the zone is decreased due to formation of the gelled diverter agent compared to the zone without gel. The permeability of the zone may be decreased to an extent that the zone is blocked by the gelled diverter agent. Thus, a "zone of decreased permeability" may be formed from the previous high permeability zone in combination with the gelled diverter agent of one or more embodiments. The decreased permeability in such a zone is a permeability that is decreased in relation to the permeability of the high permeability zone. In this way, stimulation fluid may be diverted away from (or around) the zone that includes the gelled diverter agent. Consequently, the method includes diverting stimulation fluid to a low permeability zone of the reservoir.

In one or more embodiments, the method comprises breaking up the gelled diverter agent in the reservoir with an organic solvent. In one or more embodiments, the method comprises introducing an organic solvent in the wellbore such that it contacts the gelled diverter agent, thereby breaking up the gelled diverter agent.

The organic solvent may be present in the reservoir. For example, the organic solvent may be a hydrocarbon that is native to the reservoir. Alternatively or in combination, the organic solvent may be introduced into the reservoir from the wellbore, another nearby wellbore, or another suitable source such that organic solvent reaches the gelled diverter agent downhole. In one or more embodiments, the organic solvent is diesel, a long chain hydrocarbon, or both diesel and a long chain hydrocarbon. Diesel may include but is not limited to diesel fuel. A long chain hydrocarbon may include but is not limited to octane, nonane, decane, undecane, and similar long chain hydrocarbons. As the organic solvent contacts the gelled diverter agent, the viscosity of the gel drastically reduces, thereby breaking up the gelled diverter agent (gel) and forming a diverter agent (liquid) that may be cleared from the zone of the reservoir by performing a flowback process.

A drastic reduction in viscosity may be a viscosity reduction from an initial viscosity of 50 cP to 10,000 cP (of a gelled diverter agent) to a final viscosity of less than 10 cP (of a gelled diverter agent that has been broken up, a liquid diverter agent). For example, the viscosity of the gelled diverter agent may be in a range having a lower limit of one of about 50 cP, about 60 cP, about 70 cP, about 80 cP, about 90 cP, about 100 cP, about 110 cP, about 120 cP, about 130 cP, about 140 cP, about 150 cP, about 160 cP, about 170 cP, about 180 cP, about 190 cP, about 200 cP, about 250 cP, about 300 cP, about 350 cP, about 400 cP, about 450 cP, about 500 cP, about 550 cP, about 600 cP, about 650 cP, about 700 cP, about 750 cP, about 800 cP, about 850 cP, or about 900 cP, to an upper limit of one of about 1000 cP, about 1500 cP, about 2000 cP, about 3000 cP, about 3500 cP, about 4000 cP, about 4500 cP, about 5000 cP, about 5500 cP, about 6000 cP, about 6500 cP, about 7000 cP, about 7500 cP, about 8000 cP, about 8500 cP, about 9000 cP, about 9500 cP, or about 10000 cP, where any lower limit may be combined with any upper limit. After breaking up the gelled diverter agent, the final viscosity of the diverter agent (with organic solvent) may be less than about 50 cP, such as less than about 45 cP, about 40 cP, about 35 cP, about 30 cP, about 25 cP, about 20 cP, about 15 cP, 10 cP, about 9 cP, about 8 cP, about 7 cP, about 6 cP, about 5 cP, about 4 cP, about 3 cP, about 2 cP, or about 1 cP. The final viscosity of the diverter agent may have a lower limit of about 0.1 cP, 1 cP, 5 cP, 10 cP, 20 cP, 30 cP, or 40 cP. Shear rates of the initial and final viscosity may be measured at 100 l/s.

Upon the drastic reduction in viscosity, the gelled diverter agent loses properties of a gel and the gel breaks apart to become a diverter agent. Gel properties herein include but are not limited to viscosity, such as viscosity at different temperatures under different or variable shear rates. The method may include a flowback procedure traversing the permeability zone in the reservoir. During the flowback procedure, the diverter agent (no longer a gel) may flow back with a post treatment method step, or with a post treatment fluid. Specific flowback procedures would be appreciated by a person of ordinary skill in the art.

One or more embodiments herein may be useful over a wide range of downhole conditions, including temperatures of from about 20° C. to about 350° C. For example, temperatures downhole may be in a range having a lower limit of one of about 30° C., about 40° C., about 50° C., about 60° C., about 70° C., about 80° C., about 90° C., or about 100° C. to an upper limit of one of about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., about 200° C., about 250° C., about 300° C., or about 350° C. where any lower limit is paired with any mathematically compatible upper limit. Downhole conditions may include pressures ranging from about 6000 Kilopascal (kPa) to about 25,000 kPa or other suitable downhole pressure.

As described above, diverter agents for stimulation fluids according to one or more embodiments herein may be formed from a morpholinium based surfactant, an ammonium based surfactant, and an activator.

Other diverter agents for stimulation fluids according to one or more embodiments herein may be formed from a surfactant composition having a morpholinium based surfactant and an ammonium based surfactant, and separately an activator comprising a salt. The surfactant composition and the activator may be aqueous based solutions (or mixtures).

A morpholinium based surfactant useful according to one or more embodiments herein is a zwitterionic surfactant. In one or more embodiments, the morpholinium based surfactant includes a sulfonate moiety.

Thus, a diverter agent may include a morpholinium based zwitterionic surfactant including a sulfonate moiety may have the following formula (I).

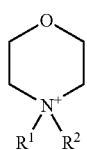

Formula (I)

In formula (I), $R_1$ and $R_2$ are alkyl groups that are the same or different having from 1 to 10 carbons (such as saturated alkyl groups, or linear saturated alkyl groups) and sulfonate terminal moieties. When $R_1$ and $R_2$ are the same, they may be from 1 to 4 carbons in length having sulfonate terminal moieties. When $R_1$ and $R_2$ are different, $R_1$ may be an alkyl group from 1 to 10 carbons in length having a sulfonate terminal moiety. When $R_1$ and $R_2$ are different, $R_2$ may be an alkyl group from 1 to 3 carbons in length having a sulfonate terminal moiety.

In one or more embodiments, $R_1$ and $R_2$ are butyl groups with sulfonate terminal moieties, as shown in formula (I-A). Formula (I-A) is N,N-bis-(4-sulfonatobutyl)-morpholinium, also called "Mor-BS" (i.e., MORpholinium molecule comprising Butane Sulfonate moieties of formula (I-A)).

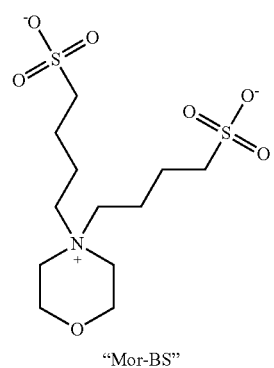

"Mor-BS"

Formula (I-A)

In one or more embodiments, $R_1$ and $R_2$ are propyl groups with sulfonate terminal moieties, as shown in formula (I-B). Formula (I-B) is N,N-bis-(3-sulfonatopropyl)-morpholinium, also called "Mor-PS" (i.e., MORpholinium molecule comprising Propane Sulfonate moieties of formula (I-B)).

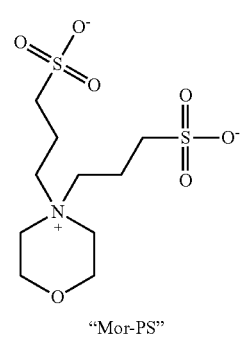

"Mor-PS"

Formula (I-B)

The morpholinium based surfactant (such as formula (I)) is not limited to a structure having two sulfonate terminal moieties. As a non-limiting example, the morpholinium based surfactant may include a sulfonate terminal moiety and a sulfonic acid terminal moiety. The morpholinium based surfactant may include two terminal sulfonic acid groups. In one or more embodiments, the morpholinium based surfactant includes charges that are balanced by the zwitterionic effect. In other words, the morpholinium based surfactant may have a neutral overall charge.

One or more morpholinium based surfactant may be provided in a composition. For example, the morpholinium based surfactant may be a combination of Mor-BS and Mor-PS.

In one or more embodiments, the morpholinium based surfactant is thermally stable from about 20° C. to about 350° C., according to thermogravimetric analysis (TGA). For example, the morpholinium based surfactant may be stable at temperatures from about 20° C. to about 350° C., 20° C. to 350° C., about 20° C. to about 340° C., 20° C. to 340° C., about 20° C. to about 330° C., 20° C. to 330° C., about 20° C. to about 320° C., 20° C. to 320° C., about 20° C. to about 310° C., or 20° C. to 310° C.

In one or more embodiments, the morpholinium based surfactant may be from about 0.5 to about 10 weight percent (wt %) compared to the total weight of the diverter agent. For example, the morpholinium based surfactant may be in a range with a lower limit of one of about 0.5 wt %, about 1.0 wt %, about 1.5 wt %, about 2.0 wt %, about 2.5 wt %, about 3.0 wt %, about 3.5 wt %, or about 4.0 wt % and an upper limit of one of about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, or about 10.0 wt % where any lower limit is paired with any mathematically compatible upper limit, compared to the total weight of the diverter agent.

Morpholinium based surfactants described herein may be formed from a synthesis including nucleophilic attack of a cyclic sulfonate ester (a sultone) by a nucleophile such as morpholine. Nucleophilic ring opening of the sultone may form a sulfonic acid or a salt thereof (sulfonate).

An ammonium based surfactant useful according to one or more embodiments herein is a zwitterionic surfactant. In one or more embodiments, the ammonium based surfactant includes a sulfonate (terminal) moiety. In one or more embodiment, the ammonium based surfactant includes a carboxylate (terminal) moiety.

Thus, a diverter agent may include an ammonium based zwitterionic surfactant having the following formula (II).

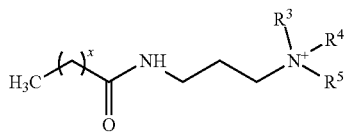

Formula (II)

In formula (II), $R_3$ is an alkyl group having from 1 to 4 carbons with a sulfonate terminal moiety or a carboxylate terminal moiety. $R_4$ and $R_5$ are alkyl groups that are the same or different having from 1 to 10 carbons (such as saturated alkyl groups or linear saturated alkyl groups). In one or more embodiments, $R_4$ and $R_5$ are hydrocarbons. X may be an integer from 15 to 27 (such that the group represented by X is a $C_{15}$ to $C_{27}$ hydrocarbon group, for example, a saturated alkyl group or a linear saturated alkyl group). In one or more embodiments, $R_3$ is a propyl group with a sulfonate terminal moiety, $R_4$ and $R_5$ are methyl groups, and X is 16 as shown in formula (II-A). Formula (II-A) is 3-[dimethyl[3-(octadecanoylamido)propyl]azaniumyl]propane-1-sulfonate salt, which may be called "$C_{18}$AMP3SB."

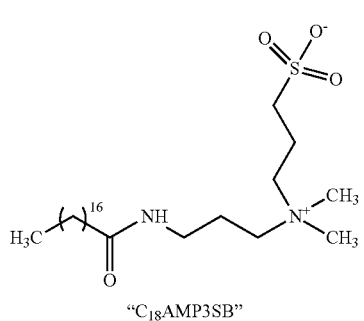

Formula (II-A)

"$C_{18}$AMP3SB"

In one or more embodiments, the ammonium based surfactant (such as formula (II) includes charges that are balanced by the zwitterionic effect. In other words, the ammonium based surfactant may have a neutral overall charge.

In one or more embodiments, the ammonium based surfactant is thermally stable from 20° C. to 350° C., according to thermogravimetric analysis (TGA).

In one or more embodiments, the ammonium based surfactant may be from about 0.5 to about 10 weight percent (wt %) compared to the total weight of the diverter agent. For example, the ammonium based surfactant may be in a range with a lower limit of one of about 0.5 wt %, about 1.0 wt %, about 1.5 wt %, about 2.0 wt %, about 2.5 wt %, about 3.0 wt %, about 3.5 wt %, or about 4.0 wt % and an upper limit of one of about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, or about 10.0 wt % where any lower limit is paired with any mathematically compatible upper limit, compared to the total weight of the diverter agent.

In one or more embodiments, the weight ratio of the morpholinium based surfactant to the ammonium based surfactant in the diverter agent (composition) may be from 0.1:10, such as a ratio having a lower limit of one of about 0.1, about 0.2, about 0.3, about 0.4, about 0.5, about 0.6, about 0.7, about 0.8, about 0.9, or about 1.0, and an upper limit of one of about 1.0, about 2.0, about 3.0, about 4.0, about 5.0, about 6.0, about 7.0, about 8.0, about 9.0, or about 10.0. In one or more embodiments, the weight ratio of the morpholinium based surfactant to the ammonium based surfactant in the diverter agent (composition) may be 1:1.

Ammonium based surfactants described herein may be formed from a two-step synthesis. The first step may include condensation of a terminal carboxylic acid molecule with a primary amine to form an amide. For example, the reaction may be a condensation of stearic acid and 3-(dimethyl-amino)-1-propylamine to form an amide (amidation). The second step may include a nucleophilic attack of a cyclic sulfonate ester (a sultone) by a nucleophile such as a tertiary amine. Nucleophilic ring opening of the sultone may form a sulfonic acid or a salt thereof (sulfonate). For example, the amide formed from the first step may be refluxed with a sultone to create a sulfonic acid or sulfonate. The previous example describes an ammonium based surfactant having a sulfonate terminal moiety. One of ordinary skill in the art would appreciate the synthetic steps that form a similar ammonium based surfactant having a carboxylate terminal moiety.

Formation of a gel according to one or more embodiments herein is initiated by contact of the above-described surfactants with an activator. In one or more embodiments, the activator is selected from the group consisting of calcium chloride ($CaCl_2$), sodium chloride (NaCl), potassium chloride (KCl), magnesium chloride ($MgCl_2$), and combinations thereof.

The weight of the activator to the surfactants may impact the gelation time. The activator may be in a range having a lower limit of one of about 1 wt %, about 2 wt %, about 3 wt %, about 4 wt %, about 5 wt %, about 6 wt %, about 7 wt %, about 8 wt %, about 9 wt %, or about 10 wt % and an upper limit of one of about 5 wt %, about 6 wt %, about 7 wt %, about 8 wt %, about 9 wt %, about 10 wt %, about 20 wt %, about 30 wt %, or about 40 wt % where any lower limit is paired with any mathematically compatible upper limit, compared to the total weight of the diverter agent.

In one or more embodiments, the weight ratio of the activator to the surfactant composition (in a diverter agent or prior to forming a gelled diverter agent) may be from 1:1 to 1:10, such as from 1:1 to 1:9, from 1:1 to 1:8, from 1:1 to 1:7, from 1:1 to 1:6, from 1:1 to 1:5, from 1:1 to 1:4, from 1:1 to 1:3, and from 1:1 to 1:2.

A diverter agent composition according to one or more embodiments is an aqueous fluid, which includes a base component that is water. The base component of the aqueous fluid can be any form of water including, but not limited to fresh water, mineral water, synthetic, filtered, and natural sea waters, brackish water, synthetic and natural brines, formation water, and production water. The water may contain a level of organics from natural or artificial sources as long as the function of the diverter agent is not inhibited. For example, the function of the diverter agent includes viscosifying to form a gel and later breaking apart from to form a liquid again. The water may contain a level of minerals or metals from natural or artificial sources as long as the function of the diverter agent is not inhibited.

In one or more embodiments, the base component may be in a range of from about 70 wt % to about 98 weight % in the total diverter agent. For example, the base component may be in a range having a lower limit of one of about 70 wt %, about 75 wt %, about 80 wt %, about 85 wt %, or about 90 wt % and an upper limit of one of about 80 wt %, about 85 wt %, about 90 wt %, about 95 wt %, about 96 wt %, about 97 wt %, or about 98 wt % where any lower limit is paired with any mathematically compatible upper limit, compared to the total weight of the diverter agent.

In one or more embodiments, the base component includes a base fluid. A suitable base fluid may include but is not limited to straight acid, emulsified acid, polymer based frac fluid, and combinations thereof.

In one or more embodiments, a diverter agent consisting essentially of a morpholinium based surfactant, an ammonium based surfactant, and an activator effectively and efficiently forms a gel sufficient for plugging a high permeability zone in a reservoir.

Compositions described herein may include an additive. A suitable additive may include but is not limited to a polymer such as guar gum, derivatized guar, or both; a crosslinking agent; a temperature stabilizer; an oxidizer breaker; a clay control agent; another surfactant; an acid; and combinations thereof.

EXAMPLES

Example 1

Example 1 features the synthesis and characterization of morpholinium based surfactant: N,N-bis-(4-sulfonatobutyl)-morpholinium (Mor-BS).

A solution of morpholine (22.95 mmol) in ethyl acetate (40 mL) in a round bottom flask was stirred for 15 minutes at room temperature followed by the addition of 1,4-butane sultone (50.49 mmol). The reaction mixture was heated to reflux, and the reaction proceeded overnight at 95° C. A white precipitate formed and was filtered and washed with ethyl acetate and diethyl ether. The product was dried under vacuum on a rotary evaporator. $^1$H-NMR [D$_2$O]=1.66 (m, 4H), 1.72 (m, 4H), 2.79 (t, 4H), 3.05 (t, 4H), 3.32 (t, 4H), 3.76 (t, 4H). $^{13}$C-NMR=20.23, 24.34, 48.36, 49.82, 50.46, 56.11. FTIR (cm$^{-1}$)=3005, 2961, 2882, 1471, 1348, 1213, 1151, 1032, 1015, 798, 736.

Thermal stability of N,N-bis-(4-sulfonatobutyl)-morpholinium (Mor-BS) was assessed by thermogravimetric analysis (TGA). In this analysis, sample was heated from room temperature to 700° C. at a rate of 10° C./min rise by purging nitrogen at a rate of 50 mL/min. The results of the thermal stability testing are shown in FIG. 1.

As depicted in FIG. 1, N,N-bis-(4-sulfonatobutyl)-morpholinium (Mor-BS) demonstrated high thermal stability and showed no appreciable loss of mass up to 305° C. It showed the onset of decomposition temperature (T$_d$) at 340° C. An abrupt loss in weight above the T$_d$ was realized. This indicated that the main chain of the surfactant had decomposed.

Example 2

Example 2 features the synthesis and characterization of morpholinium based surfactant: N,N-bis-(3-sulfonatopropyl)-morpholinium (Mor-PS).

A solution of morpholine (22.95 mmol) in ethyl acetate (40 mL) in a round bottom flask was stirred for 15 minutes at room temperature followed by the addition of 1,3-propane sultone (50.49 mmol). The reaction mixture was heated to reflux, and the reaction proceeded overnight at 95° C. A white precipitate formed and was filtered and washed with ethyl acetate and diethyl ether. The product was dried under vacuum on a rotary evaporator. $^1$H-NMR [D$_2$O]=2.07 (m, 4H), 2.87 (t, 7.32 Hz, 4H), 3.08 (t, 7.32 Hz, 4H), 3.20 (t, 7.95 Hz, 4H), 3.80 (m, 4H). $^{13}$C-NMR [D$_2$O]=19.67, 48.26, 52.37, 56.33, 64.43. FTIR (cm$^{-1}$)=3008, 2978, 1453, 1420, 1216, 1155, 1077, 786.

Thermal stability of N,N-bis-(3-sulfonatopropyl)-morpholinium (Mor-PS) was assessed by thermogravimetric analysis (TGA). In this analysis, sample was heated from room temperature to 700° C. at a rate of 10° C./min rise by purging nitrogen at a rate of 50 mL/min. The results of the thermal stability testing are shown in FIG. 2.

Figure 2:
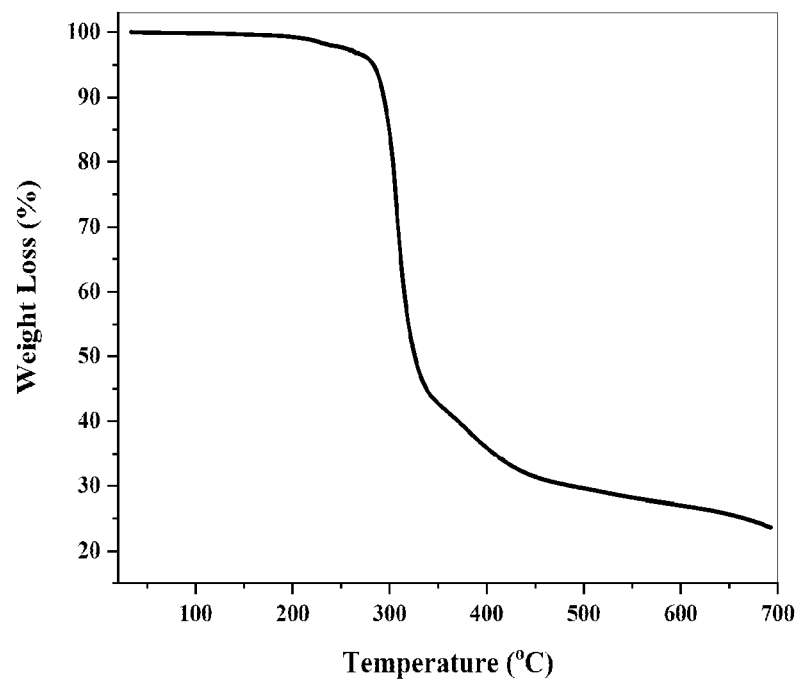
FIG. 2 shows a thermogravimetric analysis chart (Weight Loss (%) vs. Temperature (° C.)) of N,N-bis-(3-sulfonatopropyl)-morpholinium ("Mor-PS"), according to one or more embodiments herein.

As depicted in FIG. 2, N,N-bis-(3-sulfonatopropyl)-morpholinium demonstrated high thermal stability and showed no appreciable loss of mass up to 280° C. It showed the onset of decomposition temperature (T$_d$) at 310° C. An abrupt loss in weight above the T$_d$ was realized. This indicated that the main chain of the surfactant had decomposed.

Example 3

Example 3 features the synthesis and characterization of ammonium based surfactant: 3-[dimethyl[3-(octadecanoylamido)propyl]azaniumyl]propane-1-sulfonate salt ($C_{18}$AMP3SB).

In a first step, N-(3-(dimethylamino)propyl)nonadecanamide is synthesized as follows. Stearic acid (5.00 g, 20.63 mmol), 3-(dimethylamino)-1-propylamine (4.22 g, 41.25 mmol), and NaF (0.09 g, 2.06 mmol) were charged into a two-neck round bottom flask fixed with a reflux condenser. On the second neck fixed the bent tube was filled with well dried alumina (as a drying tube). Then, the temperature was raised from room temperature 160° C. and held at 160° C. for 8 hours under N$_2$ atmosphere. The water produced as a side product was adsorbed on the alumina present in the bent distilling adapter (drying tube). 3-(dimethylamino)-1-propylamine (30.94 mmol) was added in the reaction flask and the reaction continued for another 6 hours at the same temperature (160° C.). The reaction was cooled to room temperature and the solid residue was washed with cold acetone:water (93:7 mL) followed by vacuum drying. The product N-(3-(dimethylamino)propyl)nonadecanamide was a white solid. $^1$H-NMR [CD$_3$OD]=0.869 (t, 3H), 1.451-1.521 (m, 27H), 1.240-1.657 (m, 4H), 2.133 (t, 2H), 2.224 (s, 6H), 2.334 (t, 2H), 3.332 (t, 2H). $^{13}$C-NMR [CD$_3$OD]=18.95, 22.14, 25.22, 28.11, 33.32, 35.68, 35.88, 44.02, 50.66, 61.57, 63.46, 177.53, 180.53.

In a second step, 3-[dimethyl[3-(octadecanoylamido)propyl]azaniumyl]propane-1-sulfonate salt ($C_{18}$AMP3SB) is synthesized as follows. A 250-mL two-neck flask fixed with a reflux condenser was charged with N-(3-(dimethylamino)propyl)nonadecanamide (5.00 g, 15.31 mmol), 1,3-propanesultone (2.81 g, 22.97 mmol), and ethyl acetate (100 mL). The temperature of the reaction was raised to 80° C. and was maintained at 80° C. for 12 h. The white solid product was separated from the solution and washed successively using ethyl acetate (100 mL), diethyl ether (50 mL) and the product was vacuum dried to obtain 3-[dimethyl[3-(octadecanoylamido)propyl]azaniumyl]propane-1-sulfonate salt as a white solid (6.14 g, 89% yield). $^1$H-NMR [$CDCl_3$]=1.101 (t, 3H), 1.451-1.521 (m, 27H), 1.805 (m, 2H), 2.185 (t, 2H), 2.324-2.425 (m, 4H), 3.075 (t, 2H), 3.473 (t, 2H), 3.54 (s, 6H), 3.726 (t, 2H). $^{13}$C-NMR [$CD_3OD$]=14.0, 19.3, 22.6, 23.0, 25.9, 29.3, 29.6, 29.7, 31.9, 36.3, 36.4, 48.1, 50.9, 62.6, 63.2, 174.6. FTIR ($cm^{-1}$)=3265.42, 2915.00, 2884.61, 1666.49, 1552.64, 1467.54, 1174.26, 1035.13, 723.06.

Thermal stability of the molecule 3-[dimethyl[3-(octadecanoylamido)propyl]azaniumyl]propane-1-sulfonate salt ($C_{18}$AMP3SB) was assessed by thermogravimetric analysis (TGA). In this analysis, sample was heated from room temperature to 700° C. at the rate of 10° C./min rise by purging nitrogen at a rate of 50 mL/min. The results of the thermal stability testing are shown in FIG. 3.

Figure 3:
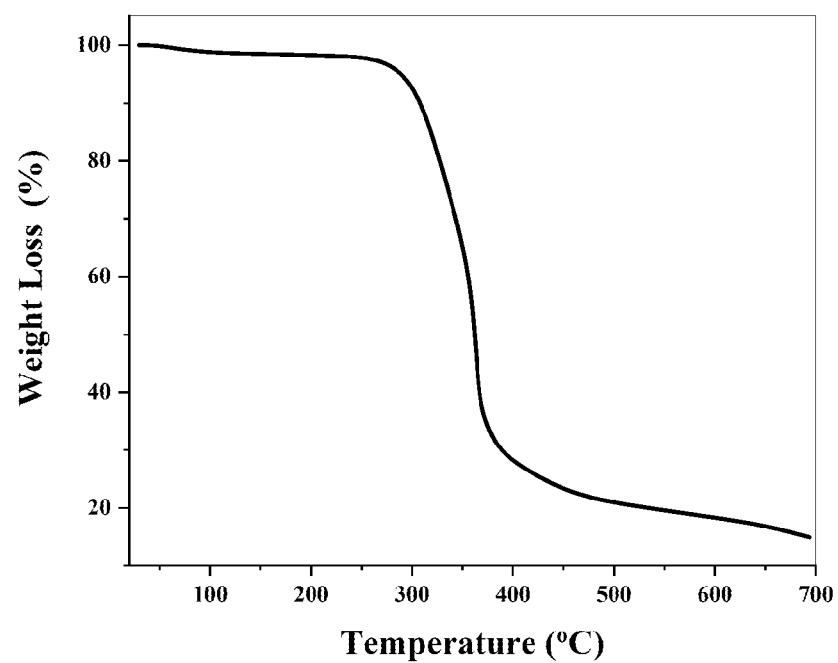
FIG. 3 shows a thermogravimetric analysis chart (Weight Loss (%) vs. Temperature (° C.)) of 3-[dimethyl[3-(octadecanoylamido)propyl]azaniumyl]propane-1-sulfonate salt ("$C_{18}$AMP3SB"), according to one or more embodiments.

As depicted in FIG. 3, 3-[dimethyl[3-(octadecanoylamido)propyl]-azaniumyl]propane-1-sulfonate salt demonstrated high thermal stability and showed no appreciable loss of mass up to 270° C. It showed the onset of decomposition temperature ($T_d$) at 350° C. An abrupt loss in weight above the $T_d$ was realized. This indicated that the main chain of the surfactant had decomposed.

Example 4

Example 4 details rheology experiments related to Mor-BS and $C_{18}$AMP3SB.

The viscosity behavior of the neat morpholinium based surfactant Mor-BS was studied in aqueous $CaCl_2$ solution (10% w/w) at temperatures of 75° F. (23° C.) and 150° F. (65° C.) under different shear rates as shown in Table 1. The viscosity behavior of the morpholinium based surfactant Mor-BS in combination with the ammonium based surfactant $C_{18}$AMP3SB was studied under the same conditions, shown in Table 1.

TABLE 1

Rheology of surfactant combinations and controls with Mor-BS and $C_{18}$AMP3SB.

| Sample | Viscosity @ Shear Rate (1/s) | | | |
|---|---|---|---|---|
|  | 10.2 1/s | 102 1/s | 170 1/s | 511 1/s |
| Mor-BS @ 75° F. | 140 | 75 | 50 | 15 |
| Mor-BS @ 150° F. | 150 | 80 | 65 | 30 |
| Mor-BS + $C_{18}$AMP3SB @ 75° F. | 200 | 110 | 85 | 40 |
| Mor-BS + $C_{18}$AMP3SB @ 150° F. | 2520 | 340 | 125 | 60 |
| Mor-BS + $C_{18}$AMP3SB @ 150° F. + 10 wt % organic solvent | <10 | <10 | <10 | <10 |

The results listed in Table 1 show that morpholinium based surfactant Mor-BS did not exhibit any appreciable viscosity change with $CaCl_2$ as the activator under these conditions. However, the mixture of the morpholinium based surfactant Mor-BS in combination with the ammonium based surfactant $C_{18}$AMP3SB (in a 1:1 ratio) displayed significant upsurge in the viscosity with $CaCl_2$ as the activator (Table 1). Under experimental conditions, it was found that a gel obtained with a viscosity of 80 cP (or greater) at a shear rate of 100 l/s and at temperatures up to 150° C. may be diverting agent.

The gelled (high viscosity) combination of Mor-BS and $C_{18}$AMP3SB can be broken down using an organic solvent (such as a hydrocarbon breaker) for easy flow back. Addition of 10% w/w organic solvent (diesel fuel) to the mixture of surfactant solution reduced to less than 10 cP at room temperature and at 150° F. (65° C.), across the shear rate range of 10.2 to 511 $s^{-1}$.

Example 5

Example 5 details rheology experiments related to Mor-PS and $C_{18}$AMP3SB.

The viscosity behavior of the neat morpholinium based surfactant Mor-PS was studied in aqueous $CaCl_2$ solution (10% w/w) at temperatures of 75° F. (23° C.) and 150° F. (65° C.) under different shear rates as shown in Table 2. The viscosity behavior of the morpholinium based surfactant Mor-PS in combination with the ammonium based surfactant $C_{18}$AMP3SB was studied under the same conditions, shown in Table 2.

TABLE 2

Rheology of surfactant combinations and controls with Mor-PS and $C_{18}$AMP3SB.

| Sample | Viscosity @ Shear Rate (1/s) | | | |
|---|---|---|---|---|
|  | 10.2 1/s | 102 1/s | 170 1/s | 511 1/s |
| Mor-PS @ 75° F. | 160 | 80 | 55 | 20 |
| Mor-PS @ 150° F. | 155 | 70 | 55 | 20 |
| Mor-PS + $C_{18}$AMP3SB @ 75° F. | 350 | 245 | 120 | 50 |
| Mor-PS + $C_{18}$AMP3SB @ 150° F. | 3000 | 560 | 260 | 90 |
| Mor-PS + $C_{18}$AMP3SB @ 150° F. + 10 wt % organic solvent | <10 | <10 | <10 | <10 |

The results listed in Table 1 show that morpholinium based surfactant Mor-PS did not exhibit any appreciable viscosity change with $CaCl_2$ as the activator under these conditions. However, the mixture of the morpholinium based surfactant Mor-PS in combination with the ammonium based surfactant $C_{18}$AMP3SB (in a 1:1 ratio) displayed significant upsurge in the viscosity with $CaCl_2$ as the activator (Table 1). Under experimental conditions, it was found that a gel obtained with a viscosity of 80 cP (or greater) at a shear rate of 100 l/s and at temperatures up to 150° C. may be diverting agent.

The gelled (high viscosity) combination of Mor-PS and $C_{18}$AMP3SB can be broken down using an organic solvent (such as a hydrocarbon breaker) for easy flow back. Addition of 10% w/w organic solvent (diesel fuel) to the mixture of surfactant solution reduced to less than 10 cP at room temperature and at 150° F. (65° C.), across the shear rate range of 10.2 to 511 $s^{-1}$.

One or more embodiments of the present disclosure provides one or more of the following advantages.

In one aspect, one or more embodiments disclosed herein relate to an acid stimulation process where the acid reacts uniformly through the reservoir rock by creating deep wormholes and enhancing the overall permeability of the near wellbore region. To achieve this, the reservoir zones with variable permeability are treated. In one or more embodiments, a diverter agent and method of use is provided that increases the composition viscosity to form a gel in a high permeability zone of a reservoir. Advantageously, this allows diversion of a tail end of a stimulation fluid that follows the diverter agent into the reservoir, to divert to lower permeability zones.

In one or more embodiments, the diverter agent is a diverter agent for stimulation fluids. Advantageously, when an organic solvent such as a hydrocarbon contacts the gelled diverter agent, the viscosity of the gelled diverter agent drastically reduces. This enables easy flow back of the fluid post treatment without damaging the reservoir. Without wanting to be bound by theory, because the viscosifying material (diverter agent) does not include solid particulates, the diverter agent is non-damaging to the formation due to effective flow back and the lack of residual deposits that remain inside the reservoir.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "about" is used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from the disclosed scope. Accordingly, all such modifications are intended to be included within the scope of this disclosure as defined in the following claims.

What is claimed:

1. A diverter agent, comprising:
a surfactant composition, comprising:
a morpholinium based zwitterionic surfactant including a sulfonate terminal moiety having formula (I):

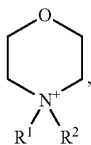

(formula (I))

wherein $R_1$ and $R_2$ are alkyl groups that are the same or different having from 1 to 10 carbons and sulfonate terminal moieties, and an ammonium based zwitterionic surfactant having formula (II):

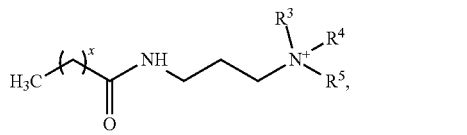

(formula (II))

wherein $R_3$ is an alkyl group having from 1 to 4 carbons with a sulfonate terminal moiety or a carboxylate terminal moiety, wherein $R_4$ and $R_5$ are alkyl groups that are the same or different having from 1 to 10 carbons, wherein X is an integer from 15 to 27; and an activator selected from the group consisting of calcium chloride, sodium chloride, potassium chloride, magnesium chloride, and combinations thereof, wherein the diverter agent is a gel, wherein the diverter agent has a viscosity of at least 80 cP at a shear rate of 100 1/s at a temperature up to 150° F.

2. The diverter agent of claim 1, wherein the morpholinium based zwitterionic surfactant including a sulfonate terminal moiety and the ammonium based zwitterionic surfactant are thermally stable from about 20° C. to about 350° C.

3. The diverter agent of claim 1, wherein $R_1$ and $R_2$ are butyl groups having sulfonate terminal moieties or propyl groups having sulfonate terminal moieties.

4. The diverter agent of claim 1, wherein X is 16, and $R_4$ and $R_5$ are methyl groups.

5. The diverter agent of claim 1, wherein $R_3$ is a propyl group with a sulfonate terminal moiety.

6. The diverter agent of claim 1, further comprising an organic solvent.

7. The diverter agent of claim 1, further comprising a base fluid.

8. The diverter agent of claim 1,
wherein the activator is present in an amount in a range of from about 5 weight percent (wt %) to about 30 wt % of the diverter agent.

9. A diverter fluid, comprising:
a base fluid;
an organic solvent
a morpholinium based zwitterionic surfactant including a sulfonate terminal moiety having formula (I):

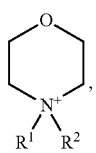

(formula (I))

wherein $R_1$ and $R_2$ are alkyl groups that are the same or different having from 1 to 10 carbons and sulfonate terminal moieties, and an ammonium based zwitterionic surfactant having formula (II):

(formula (II))

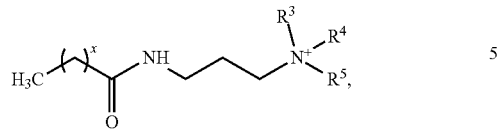

wherein R₃ is an alkyl group having from 1 to 4 carbons with a sulfonate terminal moiety or a carboxylate terminal moiety, wherein R₄ and R₅ are alkyl groups that are the same or different having from 1 to 10 carbons, wherein X is an integer from 15 to 27; and an activator selected from the group consisting of calcium chloride, sodium chloride, potassium chloride, magnesium chloride, and combinations thereof;

wherein the morpholinium based zwitterionic surfactant including a sulfonate terminal moiety and the ammonium based zwitterionic surfactant are thermally stable from about 20° C. to about 350° C., wherein the diverter fluid is a gel, wherein the diverter fluid has a viscosity of at least 80 cP at a shear rate of 100 l/s at a temperature up to 150° F.

10. The diverter fluid of claim 9, wherein the diverter fluid is selected from the group consisting of a pill fluid and a self-diverting stimulation fluid.

* * * * *